US008274392B2

(12) United States Patent
Goltenboth

(10) Patent No.: US 8,274,392 B2
(45) Date of Patent: Sep. 25, 2012

(54) APPARATUS FOR DETERMINING THE TEMPERATURE OF A MEDIUM

(75) Inventor: Frank Goltenboth, Blaustein (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 601 days.

(21) Appl. No.: 12/307,163

(22) PCT Filed: Jun. 12, 2007

(86) PCT No.: PCT/EP2007/005186

§ 371 (c)(1), (2), (4) Date: Jul. 28, 2009

(87) PCT Pub. No.: WO2008/006433

PCT Pub. Date: Jan. 17, 2008

(65) Prior Publication Data

US 2009/0315727 A1 Dec. 24, 2009

(30) Foreign Application Priority Data

Jul. 14, 2006 (EP) .................................... 06014765

(51) Int. Cl.
*G08B 17/00* (2006.01)
*H05B 6/12* (2006.01)
*G01K 1/08* (2006.01)

(52) U.S. Cl. ......................... 340/586; 219/627; 374/156

(58) Field of Classification Search .................. 340/586, 340/584; 219/620, 627; 374/141, 155, 156
See application file for complete search history.

(56) References Cited

U.S. PATENT DOCUMENTS

| | | | | |
|---|---|---|---|---|
| 4,230,731 | A | 10/1980 | Tyler | |
| 4,518,839 | A | 5/1985 | Taguchi et al. | |
| 5,371,491 | A * | 12/1994 | Wu | 340/623 |
| 6,568,848 | B1 * | 5/2003 | Chapman et al. | 374/155 |
| 6,953,919 | B2 * | 10/2005 | Clothier | 219/620 |
| 7,128,466 | B2 * | 10/2006 | Chang et al. | 374/141 |
| 2005/0247696 | A1 | 11/2005 | Clothier | |

FOREIGN PATENT DOCUMENTS

| | | | |
|---|---|---|---|
| JP | 58173193 | A | 10/1983 |
| JP | 59044792 | A | 3/1984 |

OTHER PUBLICATIONS

European Search Report for EP 06014765 dated Sep. 3, 2007.
English Translation of Japanese Office Action for Application No. 2009-518733, dispatch date: Mar. 13, 2012.

* cited by examiner

*Primary Examiner* — John A Tweel, Jr.
(74) *Attorney, Agent, or Firm* — Marshall, Gerstein & Borun LLP

(57) ABSTRACT

An apparatus for determining the temperature of a medium, in particular of a foodstuff, including a wireless transmitter, a temperature sensor, and a reception and evaluation means which is provided outside the transmitter. In order to make the apparatus more universally usable, and in order to allow a more precise determination of the temperature, the transmitter and the temperature sensor are configured as a mobile unit for direct temperature measurement in or on the medium, and the reception and evaluation means is arranged outside the medium.

11 Claims, 2 Drawing Sheets

APPARATUS FOR DETERMINING THE TEMPERATURE OF A MEDIUM

CROSS-REFERENCE TO RELATED APPLICATION

The present application claims the benefit of priority of International Patent Application No. PCT/EP2007/005186, filed Jun. 12, 2007 which application claims priority of European Patent Application No. 06014765.6, filed Jul. 14, 2006. The entire text of the priority application is incorporated herein by reference in its entirety.

FIELD OF THE DISCLOSURE

The disclosure relates to an apparatus for determining the temperature of a medium, in particular of a foodstuff.

BACKGROUND

Such an apparatus is known from WO 2004/071131. The known apparatus serves to control a cooking process for foodstuffs. The apparatus comprises a temperature sensor and a wireless transmitter in the form of an RFID tag with an antenna and an RFID reception and evaluation means. The temperature sensor and the RFID tag are accommodated on the outer side of a cooking vessel, preferably in the handle thereof. The reception and evaluation means are provided e.g. on the stove. Temperature measurement on the outer side of a cooking vessel is, however, not particularly precise and reliable, since, especially in the case of cooking vessels having a comparatively large diameter, the temperature on the outer side of the cooking vessel markedly differs from the temperature in the interior of the food to be cooked. Furthermore, this type of temperature monitoring is only possible when the cooking vessel is equipped with the transmitter and the temperature sensor. This means that the user can exclusively use these cooking vessels.

In addition so-called meat thermometers are known, which can be inserted into the medium, e.g. with the aid of a spear body, and which are able to measure the temperature in the interior, of the medium. However, these meat thermometers are hitherto only configured for reading or they require, as described in EP-A-1 199 528, a socket in the interior of the cooking chamber and possibly also a wiring. It follows that also in this case the field of use is limited to the oven.

SUMMARY OF THE DISCLOSURE

It is therefore an aspect of the present disclosure to provide an apparatus for determining the temperature of a medium with an broader field of use.

Due to the formation of a mobile unit comprising at least the temperature sensor and a transmitter, the apparatus according to the present disclosure can be used universally and for any cooking vessel. In addition, a much more meaningful temperature measurement is possible, since the temperature can be measured directly in the interior of the medium.

The mobile unit can be provided with suitable means holding especially the temperature sensor at a location where temperature measurement is particularly expedient and meaningful; in liquid media, for example, this is accomplished by a floating body which holds the temperature sensor in the middle of the liquid medium and which e.g. prevents said temperature sensor from descending to the very hot bottom of the vessel.

In addition, the mobile unit can include a sensor body which can be attached directly to a medium and which is implemented e.g. as a spear that is adapted to be inserted in the medium, e.g. a joint.

The transmitter preferably comprises a system for contactless data acquisition, in particular on the basis of radio frequency technology, as in the case of the commercially available RFID system. RFID allows contactless data acquisition and consists of the data carrier (a respective chip and an antenna in a carrier-RFID tag) and of a reader (consisting of an antenna and a decoder). Magnetic or electromagnetic fields are used for data transmission. The RFID tag is able to transmit, without having any power supply of its own, information in a low-frequency field, the energy for said low-frequency field being provided by the reader.

The reception and evaluation means can be configured for a great variety of tasks; for example, an alarm can be triggered, when predetermined limit values are exceeded, the temperature determined can be displayed, a manual input unit can be provided, which enables the user to input e.g. limit values, a timer can be provided, and a control unit controlling a heating source for the medium can be provided as well.

BRIEF DESCRIPTION OF THE DRAWINGS

In the following, embodiments of the present disclosure will be explained in detail on the basis of the drawings, in which.

DETAILED DESCRIPTION OF THE PREFERRED EMBODIMENT

Figure 1:
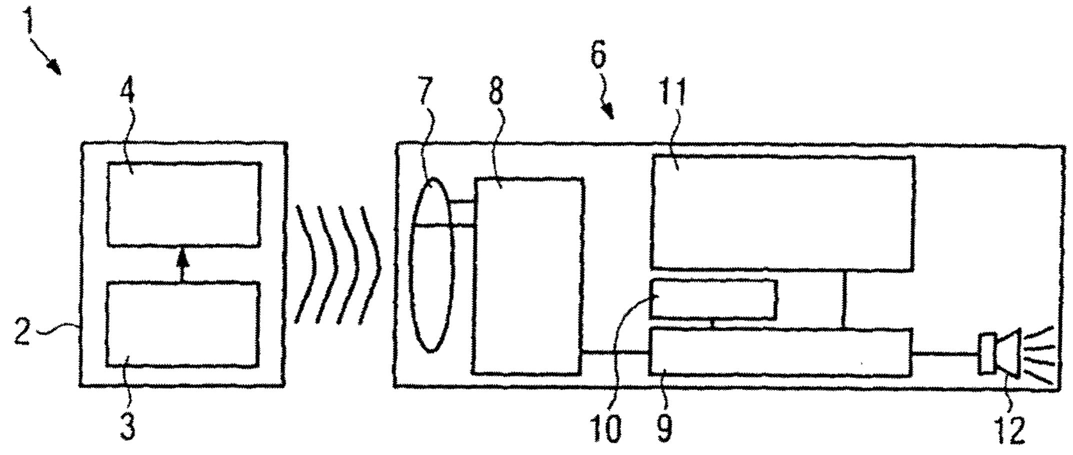
FIG. 1 shows a schematic representation of a first embodiment of an apparatus according to the present disclosure.
Figure 3:
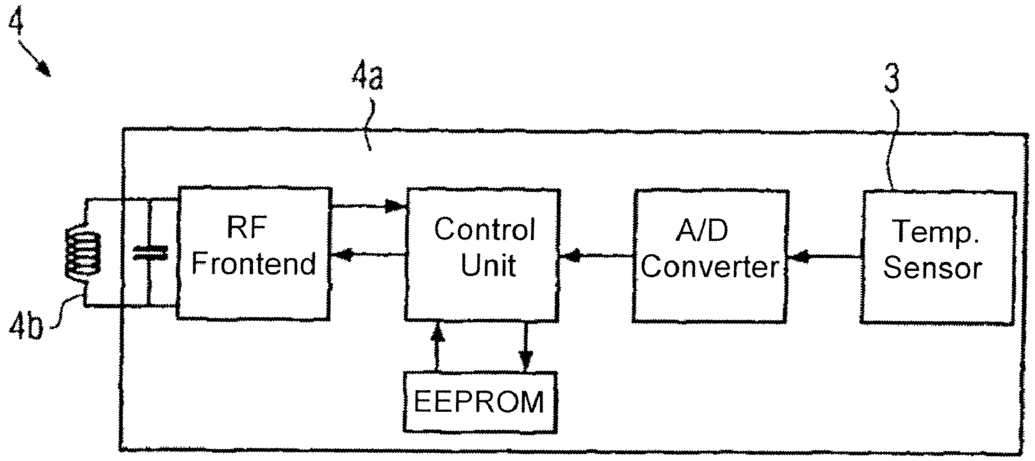
FIG. 3 shows a block diagram of an RFID tag.

FIG. 1 shows, in a schematic block diagram, an apparatus 1 according to the present disclosure used for determining the temperature of a medium. The apparatus according to the present disclosure can be used for a great variety of purposes, but it is particularly suitable for determining the temperature of foodstuffs which are heated for the purpose of cooking. The apparatus 1 includes a temperature-resistant mobile unit 2 comprising a temperature sensor 3 and a transmitter 4 in the embodiment shown. The transmitter 4 is preferably an RFID tag, i.e. a chip 4*a* with an antenna 4*b*, as shown in detail in FIG. 3. In the embodiment shown, the chip 4*a* comprises, in addition to the components which are normally provided in such chips, an integrated temperature sensor 3 and, if desired, an additional pressure sensor (not shown) which can be used e.g. for finding out whether the mobile unit 2 is positioned in the medium.

The apparatus according to the present disclosure additionally comprises a reception and evaluation means 6 which can be arranged separately from the mobile unit 2 and which communicates with the mobile unit 2 via a wireless link. The reception and evaluation means 6 comprises the components which are normally required for the RFID tag (RFID transponder), e.g. an antenna 7 and an RFID reader 8, which can be used e.g. for supplying the RFID tag with energy, for identifying it and for reading the temperature that has been determined by the temperature sensor 3. Furthermore, a controller 9 is provided for processing the signals received. The controller 9 is connected to a manual input unit 10, e.g. a keyboard, through which the user can predetermine operating parameters. In addition, a timer, which is not shown, and an indicating device 11, e.g. a display, are provided for displaying relevant or selected parameters, such as the identification of the mobile unit 2, a target temperature, a current temperature, the time which has already elapsed or which is still available, the manual inputs, etc. Furthermore, an alarm device 12 is provided, which can be used for triggering an alarm in response to predetermined operating conditions, e.g. when a predetermined temperature is exceeded, when a predetermined period of time has elapsed or when a predetermined temperature has been exceeded for a predetermined period of time or the like. The alarm can be of a visual and/or acoustic nature. The controller 9 additionally comprises a timer.

During operation, the mobile unit 2 is inserted in the medium, e.g. a food to be cooked in a cooking vessel, and the reception and evaluation means 6 is arranged at a suitable location outside of the medium, i.e. on a stove, by way of example. Making use of the reception and evaluation means a low-frequency field can be generated, cyclically or only on request, said low-frequency field causing the transmitter 4 to transmit its identity as well as the temperature determined by the sensor 3 and, where applicable, information on the pressure determined by the pressure sensor. These signals are processed by the controller 9 in the way desired. It is, for example, possible to display only the temperature and to trigger, if necessary, an alarm when a temperature which has been inputted manually via the input unit 10 is exceeded; this alarm can selectively be triggered immediately or not until a predetermined period of time has elapsed.

Figure 2:
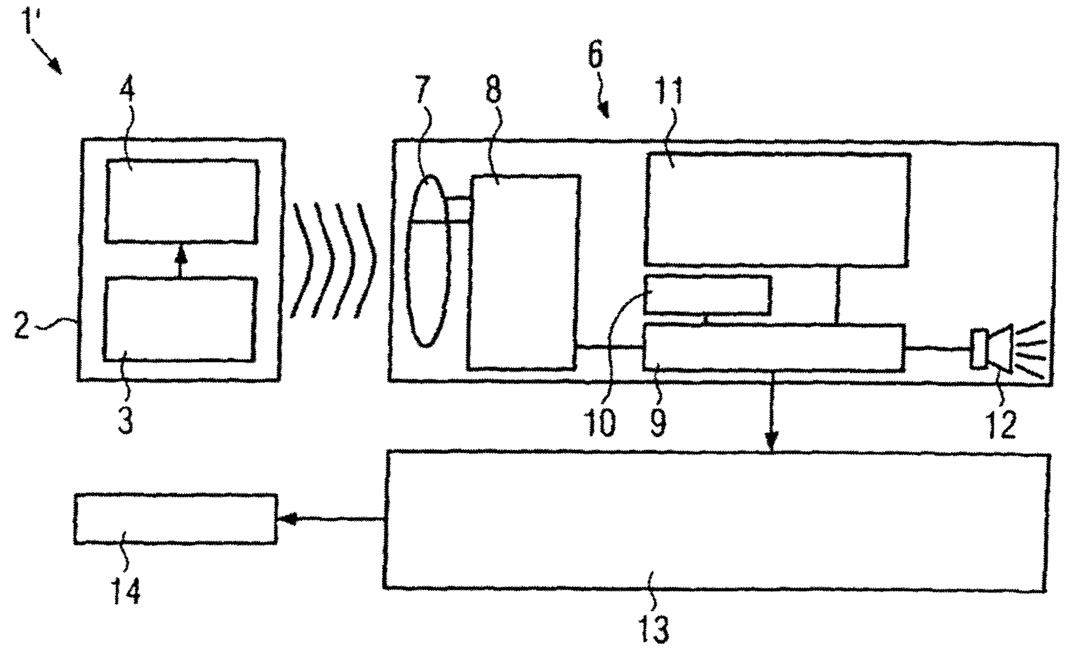
FIG. 2 shows a schematic representation of a second embodiment of an apparatus according to the present disclosure.

As can be seen in FIG. 2, the mobile unit 2 and the reception and evaluation means 6, with or without an alarm device 12, can also be combined with a control unit 13 so as to obtain a device 1' which is able to actively influence the temperature profile by controlling a heating source 14 for heating the medium. For this purpose, the control unit 13 is connected to the controller 9, the desired temperature profile being inputted via the input unit 10 unless it was previously stored in the controller.

Figure 4:
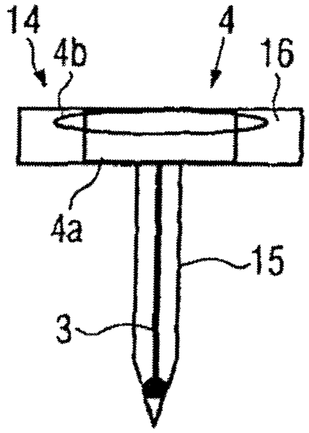
FIG. 4 shows a first embodiment of a mobile unit.
Figure 5:
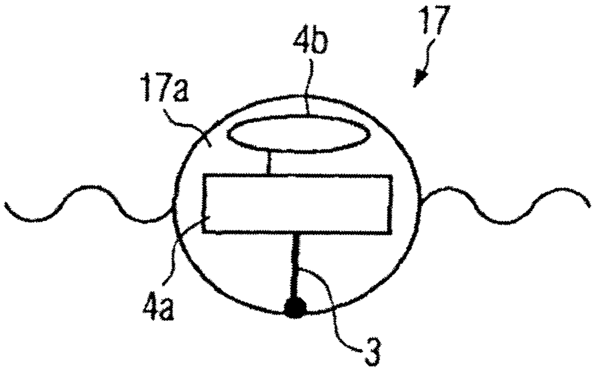
FIG. 5 shows a second embodiment of a mobile unit.

The mobile unit 2 is intended to be arranged and used directly on or in the medium and can be implemented in a great variety of different ways so as to guarantee an optimum determination of the temperature of the medium. In order to achieve this, the mobile unit 2 can e.g. be provided with a sensor body which comprises the temperature sensor 3 and which is attached to a solid medium, e.g. by suitable fastening means, such as clips or the like. As can be seen in FIG. 4, the mobile unit 2 can additionally be implemented as a so-called meat thermometer 14, i.e. it can be configured for insertion in a solid medium. The meat thermometer 14 comprises for this purpose a spear body 15 in which the temperature sensor 3 is accommodated and ahead 16 comprising the antenna **4*b* and the chip 4*a* of the transmitter 4. The head 16 is preferably implemented such that the transmitter 4** is protected against excessive heating.

In addition, the mobile unit 2 according to the present disclosure can be implemented in the form of a float 17 for use with flowable or liquid media, said float 17 comprising a floating body **17*a* which consists of a floatable material, e.g. of a temperature-resistant foam material, and which has embedded therein the antenna 4*b* and the chip 4*a* in a temperature-protected mode of arrangement. The temperature sensor 3** is preferably arranged such that it is exposed at one surface of the floating body so as to allow unhindered temperature measurement.

The mobile unit 2 may also be configured as a combination of the meat thermometer and of the float so that it can be used universally in liquid media, i.e. in media in which the floating body can float, as well as in solid media, i.e. in media in which it is held in position by an inserted spear body 15 or a clip or the like.

The present disclosure can be used not only for cooking devices but also for all other purposes, e.g. in the field of laboratory or process technology and for temperature monitoring of any kind, i.e. for heating as well as for cooling processes.

I claim:

1. An apparatus for determining the temperature of a liquid medium, comprising a wireless transmitter, a temperature sensor, a reception and evaluation means which is provided outside the transmitter, the transmitter and the temperature sensor are configured as a mobile unit for direct temperature measurement in the liquid medium, and that the reception and evaluation means is arranged outside the liquid medium, wherein the mobile unit includes a floating body for holding the temperature sensor at a predetermined depth in the liquid medium.

2. An apparatus according to claim 1, wherein the mobile unit further includes a sensor body which can be attached to a solid medium.

3. An apparatus according to claim 2, wherein the sensor body is configured as a spear for insertion in the solid medium.

4. An apparatus according to claim 1, wherein the transmitter is an RFID tag, and the reception and evaluation means comprises an RFID reader and evaluator with integrated power supply.

5. An apparatus according to claim 1, wherein the reception and evaluation means includes an alarm device.

6. An apparatus according to claim 1, wherein the reception and evaluation means includes an indicating device.

7. An apparatus according to claim 1, wherein the reception and evaluation means includes a manual input unit.

8. An apparatus according to claim 1, wherein the reception and evaluation means includes a timer.

9. An apparatus according to claim 1, wherein the reception and evaluation means includes a control unit for controlling a heating source.

10. An apparatus according to claim 1, wherein the medium is a foodstuff.

11. A float comprising a temperature sensor and an RFID tag, wherein the float is configured such as to hold the temperature sensor at a predetermined depth in a liquid medium.

* * * * *